Sept. 28, 1926.
F. A. WOODS
TRACTOR AUTOMATIC STEERING ATTACHMENT
Filed July 6, 1925
1,601,095
2 Sheets-Sheet 1
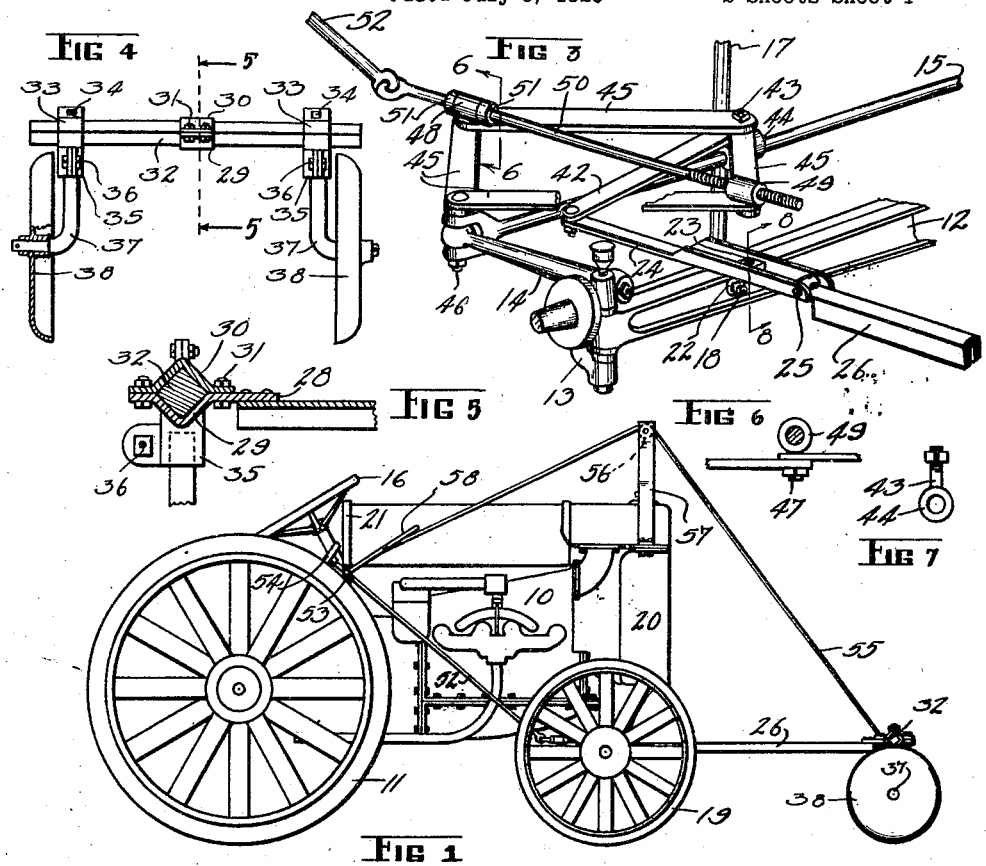
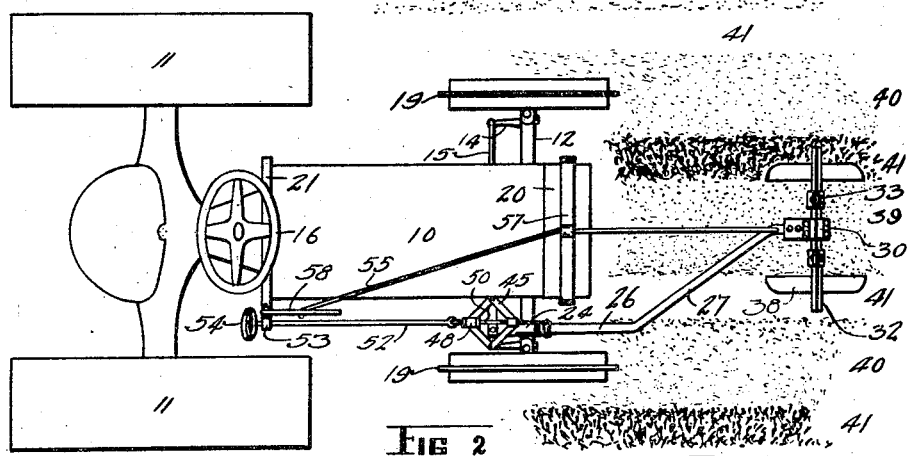
Inventor
Flavius A. Woods Sept. 28, 1926.  
F. A. WOODS  
1,601,095  
TRACTOR AUTOMATIC STEERING ATTACHMENT  
Filed July 6, 1925    2 Sheets-Sheet 2
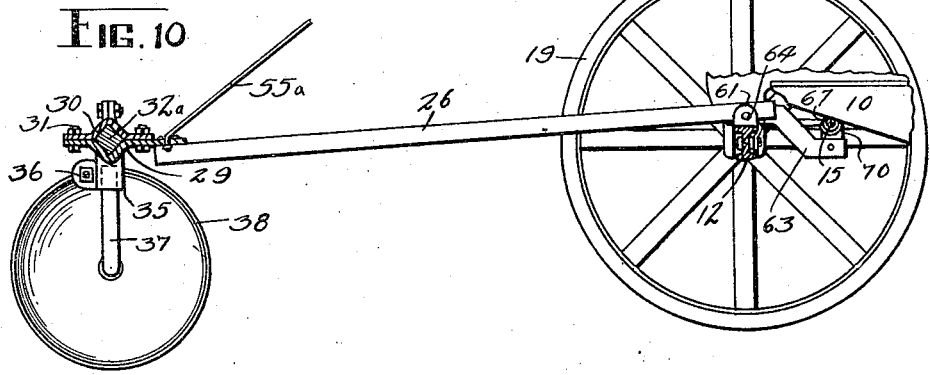
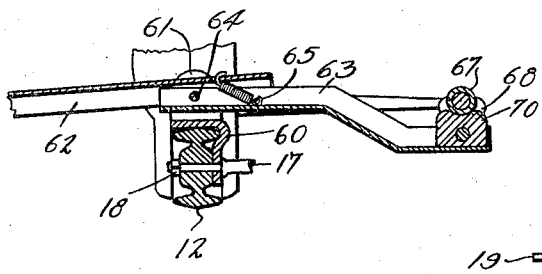
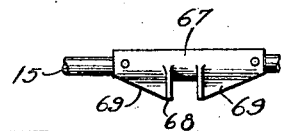
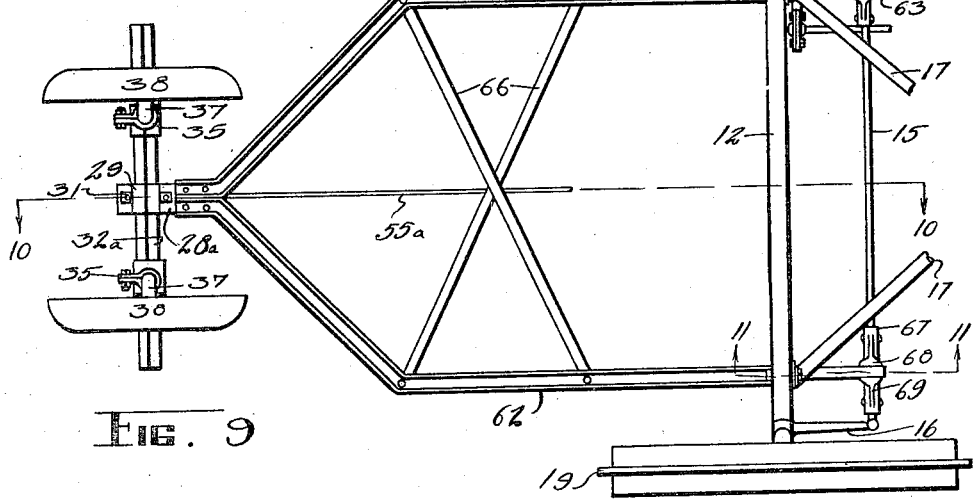
Inventor  
Flavius A. Woods Patented Sept. 28, 1926.

1,601,095

UNITED STATES PATENT OFFICE.

FLAVIEL A. WOODS, OF SLOAN, IOWA, ASSIGNOR OF ONE-HALF TO ELMER MILLER, OF SLOAN, IOWA.

TRACTOR AUTOMATIC STEERING ATTACHMENT.

Application filed July 6, 1925. Serial No. 41,464.

My invention relates to a tractor automatic steering attachment, and it is my object to provide such an attachment which is of simple, inexpensive and durable construction.

More specifically, my invention relates to a steering attachment for tractors to be used in following a listed row during the cultivation of corn with a plow cultivator, and is embodied in a specific type of following means adapted to travel in the furrow between the listed hills, said following means having an adjustability adapting it to varying conditions of slope of the ground, of the width of the furrows and the condition of the soil.

Another object is to provide means for rendering the automatic steering attachment inoperative when it is desired to steer the tractor through the ordinary steering mechanism.

With these and other objects in view, my invention consists in the construction, arrangement and combination of the various parts of my device, whereby the objects contemplated are attained, as hereinafter more fully set forth, pointed out in my claims and illustrated in the accompanying drawings, in which:

Fig. 1 is an elevation of a common type of tractor with my steering attachment operatively installed thereon.

Fig. 2 is a plan view of the same.

Fig. 3 is a perspective view illustrating in detail the connection of the steering attachment with the tractor axle and drag link, and means for adjusting the same.

Fig. 4 is an elevation of the following means.

Fig. 5 is a detail sectional view, taken on the line 5—5 of Fig. 4.

Fig. 6 is a detail sectional view, taken on the line 6—6 of Fig. 3.

Fig. 7 is a detail view of a portion of the sliding sleeve connection between the steering lever and drag link shown in Fig. 3.

Fig. 8 is a detail sectional view, taken on the line 8—8 of Fig. 3.

Fig. 9 is an inverted plan of the tractor axle and front wheels, illustrating a modified form of my invention attached thereto.

Fig. 10 is a central longitudinal sectional view through the same, taken on the line 10—10 of Fig. 9.

Fig. 11 is a detail sectional view, taken on the line 11—11 of Fig. 9.

Fig. 12 is a detail view of one of the keepers secured to the drag link used to form a connection between the levers shown in Figs. 9, 10 and 11, with the drag link.

In many sections of the West corn is planted in rows from which the soil has been listed or thrown up into long mounds or hills between the rows, so that the rows themselves form deep furrows. Such listing is done for several purposes, one of which is to resist the action of the winds against the soil in those places where the soil is light and sandy. When the corn has reached the proper height for cultivation the cultivating is first done in the furrows without interfering with the hill formation, and then later the hills are gradually cut down with the aid of the disks and the soil thrown in around the stalks of corn as they increase in size.

During this early stage of cultivation I have found that it is possible to control the movement of a tractor pulling a cultivator entirely by the use of the automatic steering attachment, which I will now describe.

It may be briefly stated at this point that advantage is taken of the sharply inclined faces of the hills separating the listed furrows, which hills are very accurately aligned with the corn rows in the planting operation and a suitable following means provided adapted to travel between said inclined faces and maintain the tractor, through a suitable connection therewith, in accurate alignment with the rows.

I have used the reference character 10 to indicate generally a tractor of common type, having the rear wheels 11, the front axle 12, the spindles 13, the steering arms 14, the connecting rod 15, connecting the steering arms 14, the ordinary steering wheel 16, the radius rod 17, connected to the front axle 12, by means of nuts 18, the front wheels 19, the radiator housing 20, and the dash 21.

In the form shown in Figs. 1 to 8 inclusive, the steering attachment comprises a suitable lever pivoted upon a bracket, 22, secured to the axle, 12, over the end of the radius rod, 17, by means of the nut, 18. The bracket, 22, has an upwardly-extending stud, 23, upon which is journaled a short lever, 24, which may be either of channel iron, as shown, or formed with spaced ears at its forward end.

Between the side flanges of the channeled portion of the lever, 24, is hinged, as at 25, an arm, 26, which, together with the short lever, 24, forms the lever by means of which steering motion is transmittted from the following mechanism to the drag link, 15.

The arm, 26, is bent inwardly, as at 27, so as to bring its forward end in alignment with the longitudinal center of the tractor. At its forward end the arm, 26, is provided with a clamp comprising a jaw member, 28, secured to the end of the arm, 26, and having a channeled portion, 29, together with a cap, 30, which is secured to the jaw member, 28, by means of bolts, 31. The cap, 30, is designed to form with the channeled member, 29, a square socket, in which is slidably received a shaft, 32, extending transversely of the longitudinal axis of the tractor. By loosening the bolts, 31, the shaft, 32, may be adjusted longitudinally.

A pair of socket members are slidably mounted on the ends of the shaft, 32, by means of split sleeves, 33, through which the shaft is received, and which may be tightened around the shaft by means of bolts, 34.

Formed integrally with the sleeves, 33, are depending collars, 35, which are likewise split and which may be tightened by means of bolts, 36. A pair of axle shafts, 37, are thus adjustably secured in the collars, 35, and may be rotated therein to the desired position of angularity and then secured by tightening the bolts, 36. The ends of the shaft, 37, are bent outwardly and bell-shaped follower disks are journaled thereon.

By sliding the sleeves, 33, relative to the shaft, 32, the distance between the disks, 38, may be adjusted to compensate for the increased width of the furrows, caused by the cutting down of the hills during the cultivating process.

In Fig. 2 I have illustrated portions of a listed field, the bottoms of the furrows being shown at 39, the tops of the hills at 40, and the sides thereof at 41.

The rear end of the steering lever is linked to the connecting rod, 15, in such a manner that movement of the lever in one direction will draw the drag link in the other and thereby turn the wheels toward the direction in which the steering lever has moved.

Where the soil is very loose, the disks may be spread further apart so as to obtain a firmer engagement with the sides of the hill. I find also that in loose soil it is often advantageous to incline the disks forwardly and inwardly somewhat whereby they will follow the furrow more readily.

The rear end of the short member, 24, is connected by means of a drag link, 42, to a stud, 43, which is formed integrally with a sleeve, 44, slidably mounted upon the connecting rod of the tractor.

I provide means for adjusting the sleeve, 44, relative to the connecting rod and securing it in any adjusted position, which is as follows. Four arms, 45, are pivoted together in parallelogram formation to form a double toggle. The ends of two of the arms are pivoted upon the stud, 43. The opposite ends of the other two arms are pivoted upon the bolt, 46, connecting the steering arm, 14, and the drag link, 15, and the other ends of the respective links are pivoted together, as shown, by means of studs, 47, formed integrally with sleeves, 48 and 49, respectively. The sleeve, 49, is threaded to receive the threaded end of a rod, 50, which extends also through the sleeve, 48, and is journaled therein. The collars, 51, secured to the rod, 50, on either side of the sleeve, 48, prevent longitudinal movement of the rod, 50, relative thereto. A single toggle using any two of the arms, 45, might be also used, and a connection direct to the rod, 15, substituted for the other pair by properly securing the shaft, 50, against longitudinal and lateral movement relative to the rod, 15. A single arm, 45, may be used to transmit the longitudinal movement of the sleeve, 49, to the drag link. A single arm, 45, may be used to transmit movement of the sleeve, 48, to the drag link by properly securing the shaft, 50, against lateral movement and by securing the sleeve, 49, to the connecting rod, 15.

A universal coupling joins the rod, 50, with a control rod, 52, extending upwardly, journaled in a bracket, 53, on the dash, 21, and having at its upper end a hand wheel, 54.

It will now be seen that rotation of the control rod, 52, will lengthen or shorten the distance between the pivot bolts, 46 and 43, and will thus shift the sleeve, 44, longitudinally of the connecting rod, 15. At the same time the flexibility of the control rod, 52, will allow movement of the connecting rod, 15, during the steering of the tractor wheels, and the entire adjusting apparatus will move as a unit with the connecting rod.

It will be understood that the arms, 45, could be connected to the connecting rod by other means than the bolt, 46, and still attain the same result.

When the end of a row has been reached it is necessary to use the ordinary steering mechanism of the tractor, and desirable to raise the following means away from the ground while turning the tractor around to align it with a new furrow. For this purpose I provide a cable, 55, secured to the outer end of the steering lever arm, 26, extending over a pulley, 56, indicated in dotted lines in Fig. 1. The pulley, 56, is supported in a bracket, 57, secured to the radiator shell, 20. The cable, 55, extends rearwardly and downwardly and is secured to a lever, 58, which in turn is pivoted to the bracket, 53. By pulling the lever, 58, rearwardly the steering attachment may be temporarily lifted while the tractor is being turned around.

In Figs. 9 to 12 inclusive I have shown a modified form of the invention in which the connecting rod, 15, is locked in a fixed position relative to the axle, 12, by the lowering of the steering attachment into the furrow. The steering attachment then serves to hold the tractor bodily in its correct position relative to the furrow.

In this form of the invention a bracket, 60, is secured near either end of the axle in a manner similar to the mounting of the bracket, 22. The brackets, 60, have upstanding spaced ears, 61. To each of the brackets, 60, between the ears, 61, is pivoted a lever structure, including a long arm, 62, and a short arm, 63, which are connected by means of the bolt, 64, extending between the ears, 61. The arm, 63, is pivoted within the arm, 62, each being formed of channel iron and a certain amount of movement in a vertical direction is allowed between the two arms. A spring, 65, tends to move the arm, 63, toward its upper limit of movement relative to the arm, 62.

The arms, 62, extend forwardly and toward each other and are braced into a unitary structure by means of braces, 66. At their forward ends they are secured to a clamp member, 28ª, which supports a following structure the same as that illustrated and described heretofore.

The connecting rod, 15, is provided with a pair of sleeves, 67, having downwardly-spaced extending ears, 68, which are connected to the ends of the sleeves by inclined integral webs, 69.

The jaw members, 70, secured to the ends of the arms, 63, are spaced to fit between the ears, 68, and thereby lock the connecting rod, 15, against movement when the arm, 63, is allowed to move upwardly to permit such engagement.

A cable, 55ª, together with raising mechanism similar to that shown in the other form of the invention is used to raise and lower the arms, 62.

When the arms, 62, are raised the engagement of the projecting portions thereof with the arms, 63, will move the arms, 63, downwardly where they will be allowed to drop downwardly away from engagement with the connecting rod, 15. When the arms, 62, are lowered, the springs, 65, will pull the arms, 63, up against the sleeves, 67. Should the connecting rod, 15, be slightly out of position the jaws, 70, will contact with the inclined web, 69, and by manipulating the steering wheel the drag link may be moved to the proper position where the springs, 65, will pull the arms, 63, upwardly into locking engagement with the ears, 68.

It will now be seen that when the lever structure is lowered the follower disks will engage with the furrows and will forcibly guide the tractor in the proper path, the wheels being locked in positions perpendicular to the axle so that they will not interfere with such guiding action.

Referring again to the form shown in Figs. 1 to 8 and to the adjusting mechanism for the steering lever, the tractor has a tendency to slide sideways when operated upon the side hill, and this tendency must be overcome by turning the wheels toward the top of the hill. At the proper angle the tendency of the wheels to turn the tractor toward the hill will be overcome by the tendency of the tractor to slide sideways down the hill.

By rotating the handwheel, 54, the steering mechanism may be caused to maintain the wheels in angular positions relative to the furrows.

Some changes may be made in the construction and arrangement of the parts of my invention without departing from the real spirit and purpose of my invention, and it is my intention to cover by my claims any modified forms of structure or use of mechanical equivalents which may be reasonably included within their scope.

I claim as my invention:

1. In a tractor steering attachment to be used in following a listed row, in combination with a tractor axle, a steering arm and connecting rod, a lever, means to fulcrum said lever on the axle, a drag link pivoted to the rear end of said lever, a sleeve pivoted to the other end of said link and having a shiftable connection with the connecting rod, and means for varying the position of said sleeve relative to said connecting rod, said means including a toggle having connections with said sleeve and the connecting rod, and a threaded rod, rotatable from the dash, to spread said toggle and thereby to vary the position of said sleeve relative to said connecting rod.

2. In a tractor steering attachment to be used in following a listed row, in combination with a tractor axle, a steering arm and connecting rod, a lever, means to fulcrum said lever on the axle, a link pivoted to the rear end of said lever, a sleeve pivoted to the other end of said link and having a shiftable connection with the connecting rod, and means for varying the position of said sleeve relative to said connecting rod, said means including a toggle having connections with said sleeve and the connecting rod.

3. In a tractor steering attachment to be used in following a listed row in combination with a tractor axle, a steering arm and connecting rod, a lever, means to fulcrum said lever on the axle, a drag link pivoted to the rear end of said lever, a sliding sleeve pivoted to the other end of said drag link and having a shiftable connection with the connecting rod, and means for varying the position of said sliding sleeve relative to said connecting rod, said means including a rod having a threaded portion, a threaded sleeve on said threaded portion, and an arm inclined relative to the connecting rod, said arm connecting the threaded sleeve with the other sleeve, the threaded rod being so mounted relative to the connecting rod that rotated movement of the threaded rod will impart to the inclined arm such a movement as to shift the sliding sleeve relative to the connecting rod.

4. In a tractor steering attachment to be used in following a listed row in combination with a tractor axle, a steering arm and connecting rod, a lever, means to fulcrum said lever on the axle, a drag link pivoted to the rear end of said lever, a sliding sleeve pivoted to the other end of said drag link and having a shiftable connection with the connecting rod, and means for varying the position of said sliding sleeve relative to said connecting rod, said means including a rod having a threaded portion, a threaded sleeve on said threaded portion and an arm inclined relative to the connecting rod connecting the rod with the sliding sleeve, the threaded sleeve serving to control the movement of the threaded rod laterally and longitudinally in such a manner that rotation of the threaded rod will impart to the inclined arm such a movement as to shift the sliding sleeve relative to the connecting rod.

5. In a tractor steering attachment to be used in following a listed row in combination with a tractor axle, a steering arm and connecting rod, a lever, means to fulcrum said lever on the axle, a drag link pivoted to the rear end of said lever, a sliding sleeve pivoted to the other end of said drag link and having a shiftable connection with the connecting rod, and means for varying the position of said sliding sleeve relative to said connecting rod, said means including a rod having a threaded portion, and rotatable from the dash, and means cooperating with said threaded portion to translate rotating movement of the rod into longitudinal adjustment of the said sleeve relative to the connecting rod.

Signed at Sioux City, in the county of Woodbury and State of Iowa, this 27th day of November, 1925.

FLAVIEL A. WOODS.